United States Patent
Shonk

(10) Patent No.: US 12,041,886 B2
(45) Date of Patent: Jul. 23, 2024

(54) SILAGE COMPACTOR

(71) Applicant: CNH Industrial America LLC, New Holland, PA (US)

(72) Inventor: Jason L. Shonk, Lancaster, PA (US)

(73) Assignee: CNH Industrial America LLC, New Holland, PA (US)

(*) Notice: Subject to any disclaimer, the term of this patent is extended or adjusted under 35 U.S.C. 154(b) by 425 days.

(21) Appl. No.: 17/378,418

(22) Filed: Jul. 16, 2021

(65) Prior Publication Data

US 2023/0019762 A1 Jan. 19, 2023

(51) Int. Cl.
*A01F 25/18* (2006.01)
*B06B 1/10* (2006.01)
*E02D 3/026* (2006.01)

(52) U.S. Cl.
CPC .............. *A01F 25/183* (2013.01); *B06B 1/10* (2013.01); *E02D 3/0265* (2013.01)

(58) Field of Classification Search
CPC ........ A01F 25/183; A01F 25/186; E02D 3/02; E02D 3/026; E02D 3/0265; E02D 3/032; E02D 3/039; E02D 3/046; E02D 3/074; E01C 19/23; E01C 19/231; E01C 19/233; E01C 19/25; E01C 19/255; E01C 19/26; E01C 19/266; E01C 19/27; E01C 19/28; E01C 19/281; E01C 19/286; E01C 19/287; E01C 19/288

See application file for complete search history.

(56) References Cited

U.S. PATENT DOCUMENTS

| | | | |
|---|---|---|---|
| 3,814,532 A | 6/1974 | Barrett et al. | |
| 5,618,133 A | 4/1997 | Mitsui et al. | |
| 6,402,424 B2* | 6/2002 | Mitsui | E01C 19/286 404/117 |
| 6,749,364 B1* | 6/2004 | Baker | E01C 19/48 404/118 |
| 7,059,802 B1* | 6/2006 | Geier | E01C 19/286 404/117 |
| 8,965,638 B2* | 2/2015 | Ries | B06B 1/161 701/50 |

(Continued)

FOREIGN PATENT DOCUMENTS

| | | |
|---|---|---|
| DE | 20 2011 001 871 U1 | 6/2011 |
| EP | 2 263 443 B1 | 12/2010 |
| WO | WO-2013/068396 | 5/2013 |

OTHER PUBLICATIONS

2527. Silage production technology using grass thickening vibratory method; JVE International Ltd. Journal of Vibroengineering, Aug. 2017, vol. 19, Issue 5; Egle Jotautiene, et. al.; pp. 3207-3215.

*Primary Examiner* — Matthew Katcoff
(74) *Attorney, Agent, or Firm* — Rickard K. DeMille; Rebecca L. Henkel; Peter K. Zacharias

(57) ABSTRACT

A vehicle includes a frame, a tractive element coupled to the frame, a prime mover coupled to the frame and configured to drive the tractive element to propel the vehicle, and a silage compactor. The silage compactor includes a wheel rotatably coupled to the frame and positioned to engage silage positioned below the frame, a vibrator coupled to the wheel and configured to cause the wheel to vibrate, and a controller configured to control the vibrator to vibrate the wheel while the wheel is in contact with the silage to compress the silage.

19 Claims, 10 Drawing Sheets

(56) References Cited

U.S. PATENT DOCUMENTS

| | | | |
|---|---|---|---|
| 9,169,605 B2 * | 10/2015 | Corcoran | E01C 19/288 |
| 9,181,671 B2 * | 11/2015 | Thomson | E02D 3/032 |
| 11,421,390 B2 * | 8/2022 | Oetken | E01C 19/266 |
| 11,829,151 B2 * | 11/2023 | Endo | G05D 1/0223 |
| 2005/0147469 A1 | 7/2005 | Miskin | |

* cited by examiner

SILAGE COMPACTOR

BACKGROUND

In order to provide a consistent, long-term food source for livestock (e.g., cattle, horses, etc.), fodder (e.g., clover, grass, alfalfa, oats, etc.) is preserved as silage. Silage can be produced by piling the fodder (e.g., within a bunker or other storage area) and allowing the fodder to ferment over time, preserving the fodder. This fermentation process is inhibited by the presence of oxygen (e.g., from air). Accordingly, if too much air is present within the pile of fodder, the silage will spoil before properly fermenting. To reduce the oxygen content of a silage pile, the pile may be compacted by driving over the pile with a vehicle.

SUMMARY

One embodiment relates to a vehicle. The vehicle includes a frame, a tractive element coupled to the frame, a prime mover coupled to the frame and configured to drive the tractive element to propel the vehicle, and a silage compactor. The silage compactor includes a wheel rotatably coupled to the frame and positioned to engage silage positioned below the frame, a vibrator coupled to the wheel and configured to cause the wheel to vibrate, and a controller configured to control the vibrator to vibrate the wheel while the wheel is in contact with the silage to compress the silage.

Another embodiment relates to a silage compactor for a vehicle. The silage compactor includes a wheel, an isolator rotatably coupling the wheel to a frame of the vehicle and configured to inhibit transmission of vibrations from the wheel to the frame, a vibrator coupled to the wheel and configured to cause the wheel to vibrate, and a controller configured to vary a vibrational characteristic of the vibrator.

Still another embodiment relates to a vehicle. The vehicle includes a frame, an axle including a hub rotatably coupled to the frame, a wheel removably coupled to the hub and defining a volume configured to contain a liquid ballast, a prime mover coupled to the axle and configured to drive the wheel to propel the vehicle, and a vibrator including a weight coupled to a motor. The motor is configured to drive the weight to rotate about an axis of rotation. The weight has a center of mass that is offset a distance from the axis of rotation. The vehicle further includes an isolator coupled to the wheel and the frame and configured to inhibit transmission of vibrations from the wheel to the frame and a controller. The controller is configured to vary at least one of (a) a rotation speed of the motor or (b) the distance between the center of mass and the axis of rotation in response to an indication that a portion of a pile of silage that is in contact with the wheel has exceeded a threshold depth.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes a silage compactor is used to compress a pile of silage. The silage compactor includes a wheel that is rotatably coupled to a frame of the vehicle. The wheel is positioned to be in contact with a pile of silage below the vehicle. The wheel is coupled to a vibrator that vibrates the wheel. In operation, the wheel presses down on the silage, compressing the silage and forcing air out of the pile. The vibration of the wheel facilitates quickly and densely packing the silage, improving the compacting performance of the wheel. In some embodiments, the wheel is coupled to the frame by disconnecting a wheel and tire assembly from a hub of an axle and coupling the wheel to the hub. Accordingly, the wheel may be driven by a prime mover of the vehicle to propel the vehicle.

Overall Vehicle

Figure 1:
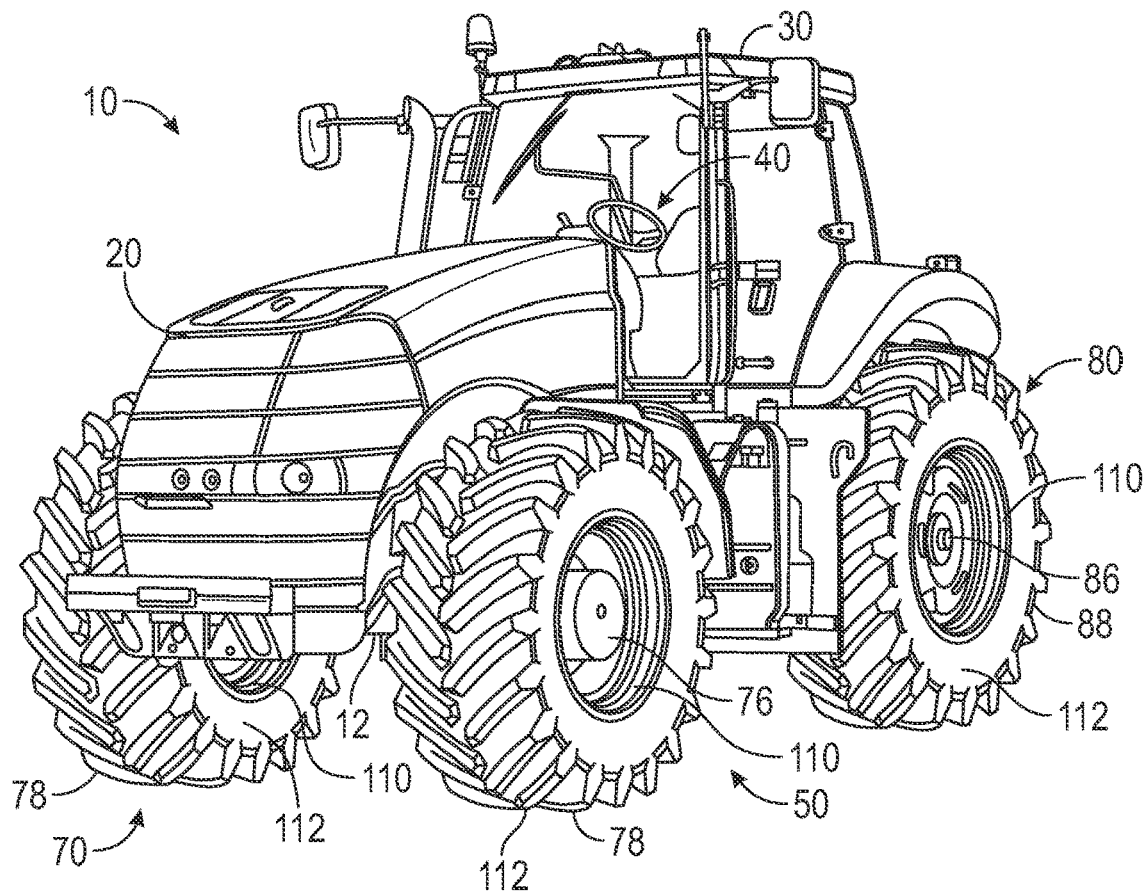
FIG. 1 is a perspective view of a vehicle, according to an exemplary embodiment.
Figure 2:
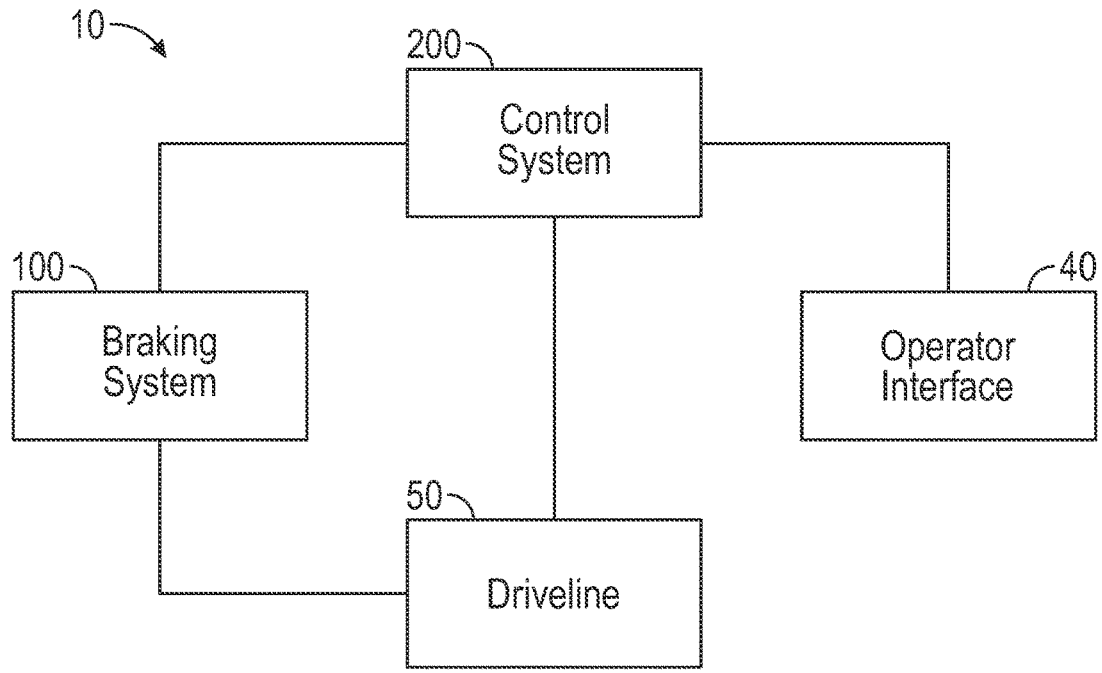
FIG. 2 is a schematic block diagram of the vehicle of FIG. 1, according to an exemplary embodiment.
Figure 3:
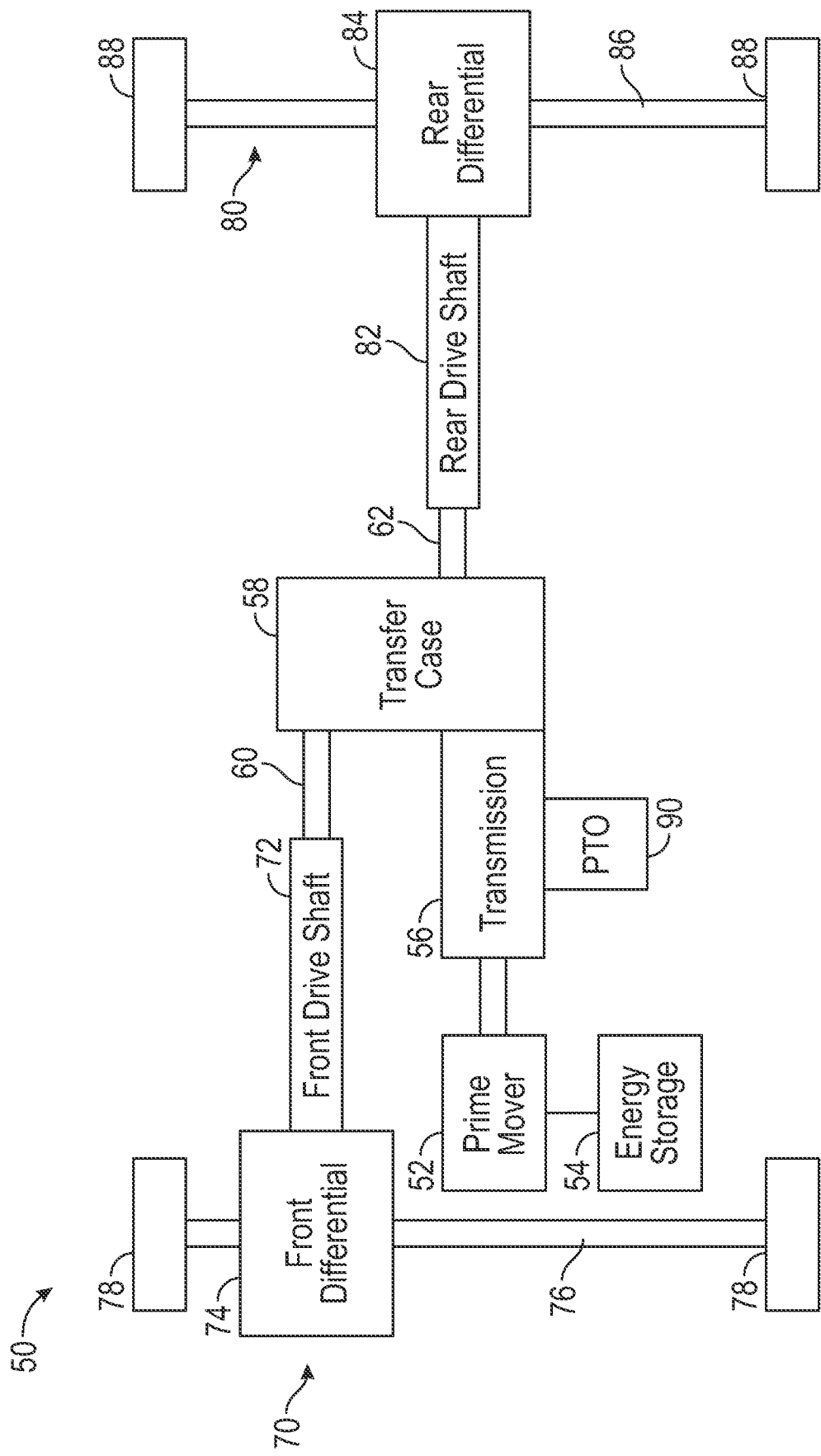
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 200, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements (e.g., wheel and tire assemblies), shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements (e.g., wheel and tire assemblies), shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. Specifically, the front tractive elements 78 and the rear tractive elements 88 each include a wheel 110 coupled to a tire 112 (e.g., an inflatable tire). In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Silage Compactor

Figure 4:
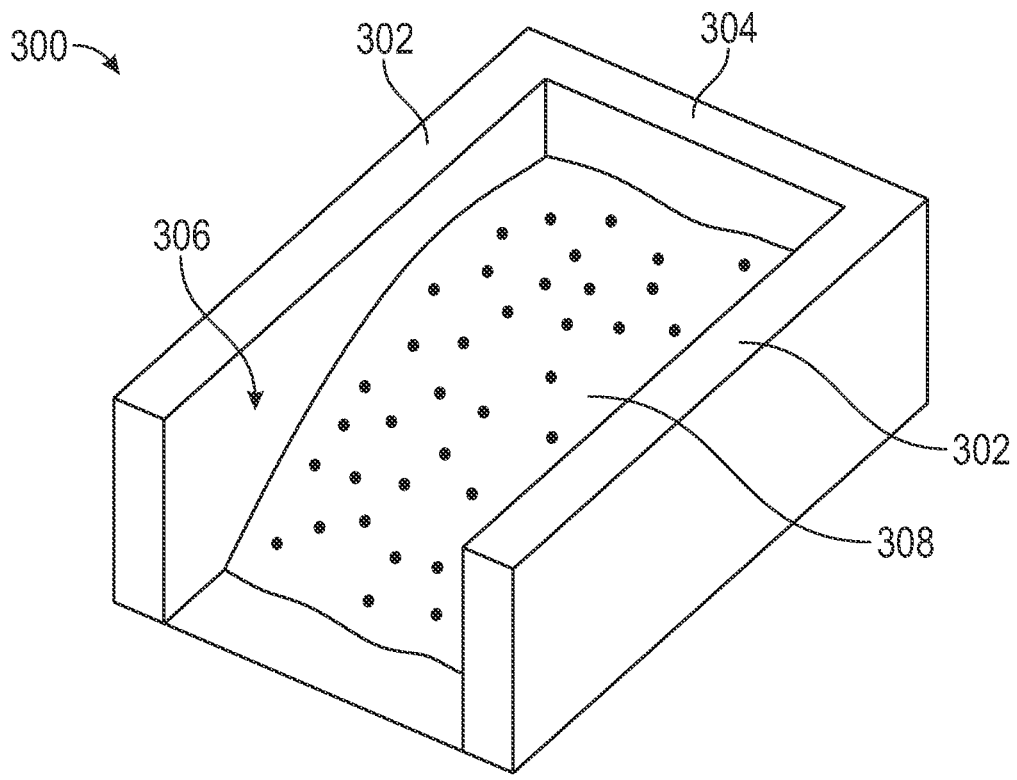
FIG. 4 is a perspective view of a silage bunker, according to an exemplary embodiment.

Referring to FIG. 4, a silage container or storage body is shown as bunker 300, according to an exemplary embodiment. The bunker 300 includes a series of partitions, shown as side walls 302 and rear wall 304, that define a space, shown as storage volume 306, therebetween. In some embodiments, the side walls 302 and the rear wall 304 are made from concrete. The side walls 302 are positioned on opposite lateral sides of the storage volume 306 and extend longitudinally. A front opening to the bunker 300 is formed between the side walls 302 at the front of the storage volume 306. The rear wall 304 is coupled to each of the side walls 302 and extends laterally between the side walls 302. The storage volume contains a volume of plant material, animal feed, or fodder (e.g., clover, grass, alfalfa, oats, etc.), shown as silage 308.

Figure 5:
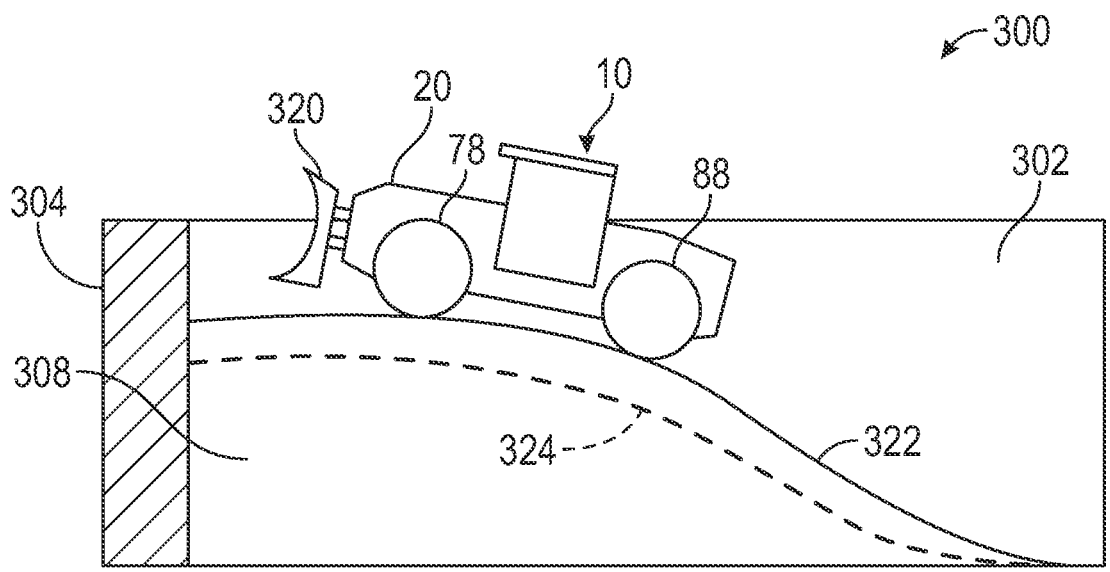
FIG. 5 is a side section view of the silage bunker of FIG. 4 including a pile of silage being compacted by the vehicle of FIG. 1.

Referring to FIGS. 4 and 5, to form the pile of silage 308, the silage 308 is deposited or dispensed (e.g., from a trailer of a vehicle) near the front opening of the bunker 300. The vehicle 10 is then used to form the pile of silage 308. As shown in FIG. 5, the vehicle 10 includes an implement (e.g., a plow, a scoop, a bucket, etc.), shown as blade 320. The blade 320 couples to the frame 12 near the front of the vehicle 10 and forms a scoop that extends laterally across the front of the vehicle 10. An operator controls the vehicle 10 to drive forward, forcing the blade 320 into the loose silage 308 and forming the silage 308 into a pile. The pile may be shaped with a gradual incline to facilitate the vehicle 10 driving onto the pile. When the pile is initially formed, the silage 308 is loose and large pockets of air are present within the pile. The presence of air within the pile is undesirable, as oxygen within the air inhibits fermentation of the silage 308 and leads to spoilage. The solid line 322 represents the level of the silage 308 in the bunker 300 when the silage 308 is loose.

In order to reduce the amount of air in the pile, the vehicle 10 is used to compress the silage 308. Specifically, the vehicle 10 drives back and forth over the silage 308, such that the front tractive elements 78 and the rear tractive elements 88 impart a downward force on the silage 308 due to the weight of the vehicle 10. This forces the silage 308 together, forcing the air out from between the silage 308. In order to evenly compress the silage 308, the vehicle 10 may repeatedly move forward and backward while gradually moving laterally across the surface of the silage 308 until the vehicle 10 has compressed the entire pile. The dashed line 324 represents the level of the silage 308 in the bunker 300 after the silage 308 has been compressed.

Figure 6:
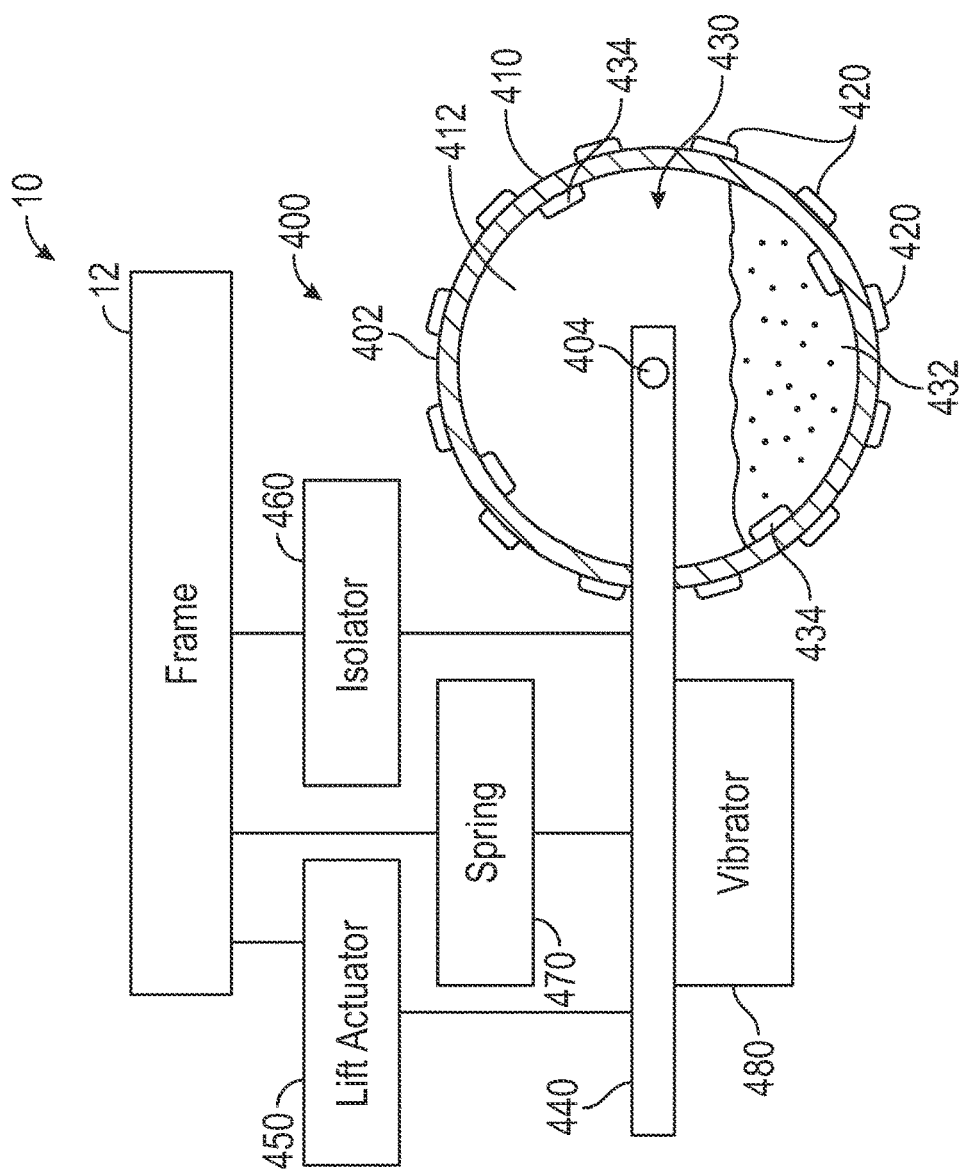
FIG. 6 is a schematic block diagram of a silage compactor of the vehicle of FIG. 1, according to an exemplary embodiment.

Referring to FIG. 6, the vehicle 10 includes one or more silage compaction assemblies, shown as silage compactor 400. The silage compactor 400 is configured to improve the efficacy of the vehicle 10 in compacting the silage 308. By way of example, the silage compactor 400 may increase the speed of the compaction, such that the vehicle 10 can compact a pile of silage 308 to a given density more quickly than other vehicles. By way of another example, the silage compactor 400 may improve the range of the compaction of the vehicle 10 such that the vehicle 10 is able to compact a larger area of the silage 308 at one time as compared to other vehicles. By way of another example, the silage compactor 400 may increase the density of compaction such that the vehicle 10 is able to compact silage 308 to a greater density than other vehicles.

Referring to FIG. 6, a generic embodiment of the silage compactor 400 is shown. The silage compactor 400 includes a tractive element, rolling member, annular member, disc, rod, roller, or drum, shown as wheel 402. The wheel 402 is rotatably coupled to the frame 12 of the vehicle 10. In some embodiments, the wheel 402 is configured to rotate about a lateral axis of rotation, shown as axis 404. The wheel 402 is positioned to engage the silage 308 during a silage compaction operation. Specifically, the wheel 402 is positioned such that a bottom, circumferential portion of the wheel 402 engages the silage 308. The wheel 402 rotates about the axis 404 during movement of the vehicle 10 relative to the silage 308 (e.g., forward movement, rearward movement, turning, etc.). The wheel 402 may rotate passively (e.g., the wheel 402 may be free to rotate such that movement of the vehicle 10 relative to the silage 308 drives the wheel 402). The wheel 402 may rotate actively (e.g., the wheel 402 may be driven by a motor).

In some embodiments, the wheel 402 includes an circumferential wall or tube, shown as outer wall 410, and a pair of lateral walls, shown as side walls 412. The outer wall 410 may be radially symmetrical. In some embodiments, the outer wall 410 is positioned at a substantially constant radius from the axis 404. The side walls 412 extend substantially perpendicular to the axis 404. In some embodiments, the wheel 402 is substantially cylindrical. In other embodiments (e.g., such as the embodiment of FIG. 11), the wheel 402 includes an inner cylindrical wall, such that the wheel 402 is annular. In some embodiments, the outer wall 410 and/or the side walls 412 are made of a metal. In some such embodiments, the outer wall 410 and/or the side walls 412 are made of steel.

Figure 7:
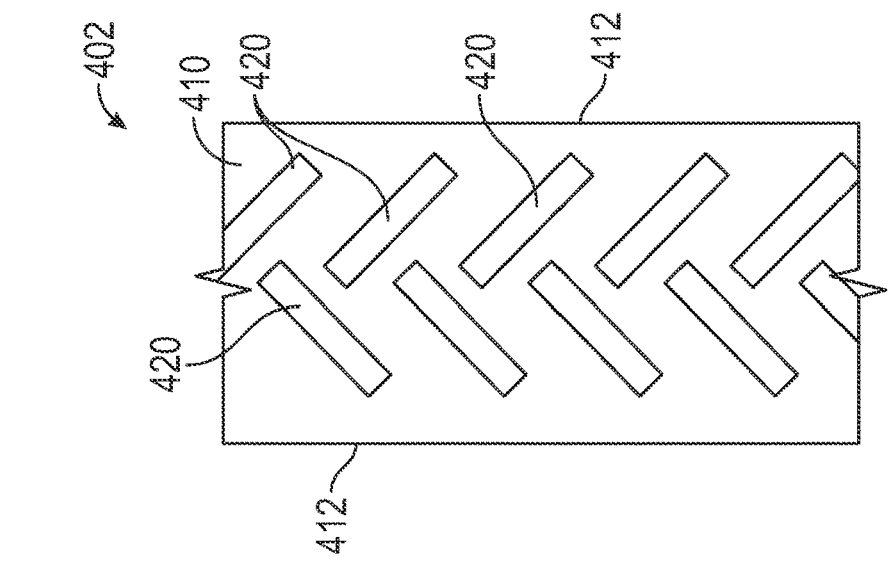
FIG. 7 is a front detail view of a wheel of the silage compactor of FIG. 6.

Referring to FIGS. 6 and 7, the wheel 402 includes one or more protrusions, ribs, treads, or cleats, shown as cleats 420. The cleats 420 are fixedly coupled to the outer wall 410 and extend radially outward from the outer wall 410. In some embodiments, the cleats 420 are made from a compliant material, such as rubber or plastic. The cleats 420 provide a texture to the exterior of the wheel 402 and may facilitate driving the wheel 402 without slipping. As shown, the cleats 420 are arranged in a herringbone pattern such that the cleats 420 are sequentially arranged at opposing angles relative to a central plane of the wheel 402. In other embodiments, the cleats 420 are otherwise arranged. By way of example, the cleats 420 may extend laterally across the tire, parallel to one another.

In some embodiments, the wheel 402 defines an internal volume or ballast volume, shown as volume 430. In some such embodiments, the volume 430 contains a mass of ballast material, shown as ballast 432. The ballast 432 increases the weight of the wheel 402, improving the compacting performance of the silage compactor 400. In some embodiments, the ballast 432 is a flowable material (e.g., a liquid, a flowable solid material, etc.) without a fixed geometrically defined form. By using a flowable material, the ballast 432 may remain near the bottom of the wheel 402 as the wheel 402 rotates, ensuring that the center of gravity of the vehicle 10 is as low as possible to improve vehicle stability. Use of a flowable material may also facilitate the ballast 432 conforming to the shape of the wheel 402 to efficiently fill the volume 430.

In some embodiments, the ballast 432 is water. Using water as the ballast 432 may facilitate reconfiguring the wheel 402. By way of example, water can be disposed of without a substantial environmental impact if the operator desires to utilize less ballast 432. By way of another example, water can be easily accessed from numerous different sources if the operator desires to utilize additional ballast 432. In other embodiments, the ballast 432 includes a flowable solid material, such as sand, small rocks, or ball bearings.

In some embodiments, the volume 430 is selectively sealed. By way of example, one of the side walls 412 may define an aperture that is selectively covered with a cap that seals the volume 430. Such an aperture may facilitate adding or removing ballast 432 depending upon the application. By way of example, the ballast 432 may be added when the vehicle 10 is in use and removed when the vehicle 10 is being transported between job sites (e.g., to increase fuel efficiency). As shown in FIG. 6, the ballast 432 fills only a portion of the volume 430. In other embodiments, the ballast 432 fills the entire volume 430.

In some embodiments, the wheel 402 includes one or more protrusions or ribs, shown as agitators 434, that interact with the ballast 432 to produce vibrations. The agitators 434 are coupled to the outer wall 410 and/or the side walls 412 and extend inward, into the volume 430. The agitators 434 are positioned such that the agitators 434 move through the ballast 432 as the wheel 402 rotates. The movement of the agitators 434 through the ballast 432 may agitate the ballast 432 and/or cause the ballast 432 to strike the agitators 434, causing the wheel 402 to vibrate. As discussed herein, vibration of the wheel 402 may facilitate compaction of the silage 308.

Referring again to FIG. 6, the wheel 402 is rotatably coupled to the frame 12. Specifically, the wheel 402 is shown as being directly, rotatably coupled to a structural member, frame member, or structural assembly, shown a subframe 440, which is in turn coupled to the frame 12. The subframe 440 may be a frame member (e.g., a tubular member). Alternatively, the subframe 440 may be another structure, such as the front axle 76 or the rear axle 78.

The subframe 440 is coupled to the frame 12. As shown, the subframe 440 is coupled to the frame 12 by an actuator (e.g., a hydraulic cylinder, an electric motor, a manually operated winch, etc.), shown as lift actuator 450, a vibrational isolator (e.g., a section of compliant material, a dampener, etc.), shown as isolator 460, and a biasing element, shown as spring 470. Specifically, the lift actuator 450, the isolator 460, and the spring 470 are each coupled to the frame 12 and the subframe 440. The lift actuator 450, the isolator 460, and the spring 470 may control movement of the wheel 402 relative to the frame 12 by controlling movement of the subframe 440 relative to the frame 12. In other embodiments, one or more of the lift actuator 450, the isolator 460, or the spring 470 are omitted from the silage compactor 400. In some embodiments, the subframe 440 is directly coupled to the frame 12.

The lift actuator 450 is configured to raise and lower the wheel 402 relative to the frame 12. As shown, the lift actuator 450 is coupled to the frame 12 and the subframe 440. Accordingly, the lift actuator 450 may raise and lower the wheel 402 by varying the distance between the subframe 440 and the frame 12. In other embodiments, the lift actuator 450 may be directly coupled to the wheel 402. The lift actuator 450 may be used to control engagement between the wheel 402 and a support surface (e.g., the ground, the silage 308, etc.). By way of example, the lift actuator 450 may lift the wheel 402 out of contact with the support surface when the silage compactor 400 is not being used and lower the wheel 402 into contact with the support surface when the silage compactor 400 is being used.

The isolator 460 may limit, reduce, or inhibit the transmission of vibrations from the wheel 402 to the frame 12. By way of example, the isolator 460 may reduce the amplitude and/or frequency of the vibration of the frame 12 relative to the amplitude and/or frequency of the vibration of the wheel 402. This may facilitate a smooth and enjoyable riding experience for the operator without inhibiting beneficial vibration of the wheel 402. Reducing the vibration of the frame 12 may also reduce wear of the frame 12 and components of the vehicle 10 coupled to the frame 12.

In some embodiments, the isolator 460 includes a compliant material or cushion, such as rubber or plastic. By way of example, the isolator 460 may include a block or other section of compliant material that couples the wheel 402 to the frame 12. Additionally or alternatively, the isolator 460 may include a damper or shock absorber, such as a hydraulic damper, gas damper, or electromagnetic damper, that couples the wheel 402 to the frame 12. A damper may be structured to dissipate kinetic energy (e.g., by converting the kinetic energy to another form) that would otherwise be transferred to the frame 12, causing the frame 12 to vibrate. By way of example, a hydraulic damper or gas damper may dissipate kinetic energy by forcing hydraulic fluid or gas through an orifice or other valving. By way of example, an electromagnetic damper may dissipate kinetic energy by electromagnetically converting kinetic energy to electrical energy that is stored (e.g., in batteries or capacitors) or converted to thermal energy (e.g., by a resistor).

The spring 470 may apply a downward biasing force to biasing the wheel 402 away from the frame 12. A downward biasing force may provide similar benefits to the ballast 432 without increasing the mass of the vehicle 10. By way of example, the downward biasing force may increase the force applied by the wheel 402 on the silage 308, improving the compaction of the silage 308. The spring 470 may include compression springs, torsion springs, gas springs, and/or other types of springs.

The silage compactor 400 further includes a vibration generator or vibrational actuator, shown as vibrator 480, that is coupled to the wheel 402. The vibrator 480 may be directly coupled to the wheel 402 or coupled to the wheel 402 through the subframe 440. The vibrator 480 is configured to receive a first form of energy (e.g., electrical energy, hydraulic energy, rotational mechanical energy, etc.) and output kinetic energy in the form of vibrations. Operation of the vibrator 480 causes the wheel 402 to vibrate. Vibrating the wheel 402 may improve the efficacy of the wheel 402 in compacting the silage 308 relative to the wheel 402 without the vibrations. By way of example, the vibrations may increase the speed of the compaction and/or the density of compaction.

Figure 9:
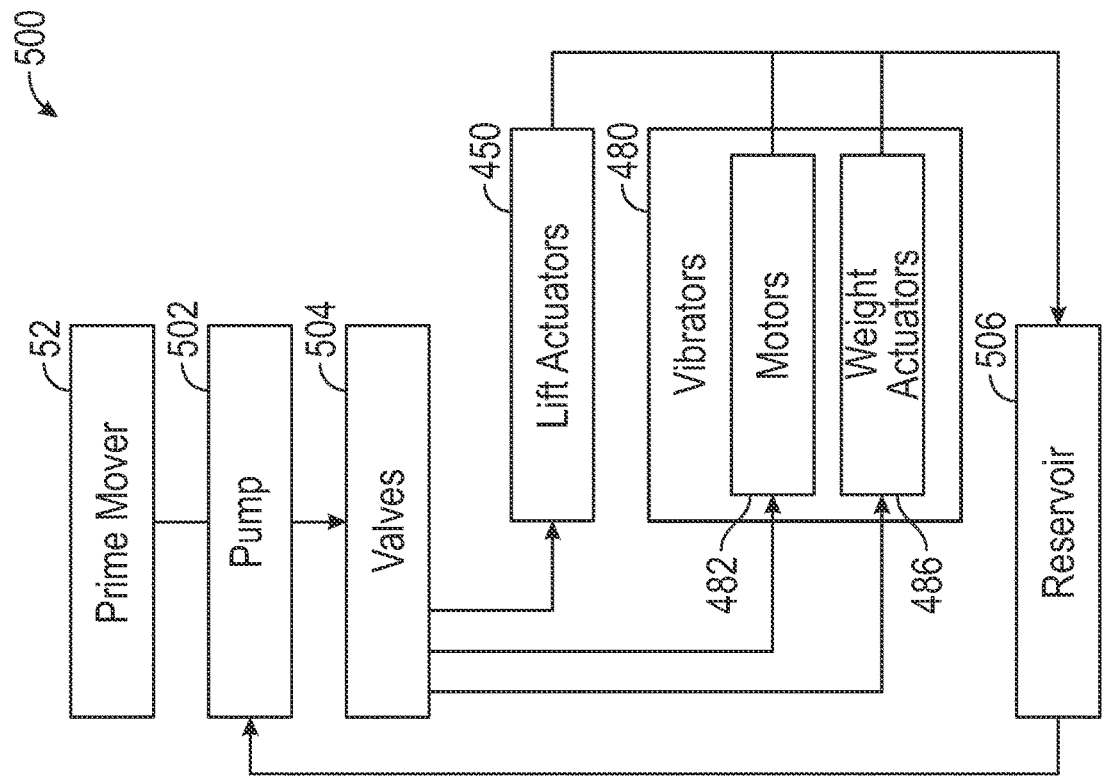
FIG. 9 is a schematic block diagram of a hydraulic system of the vehicle of FIG. 1, according to an exemplary embodiment.
Figure 8:
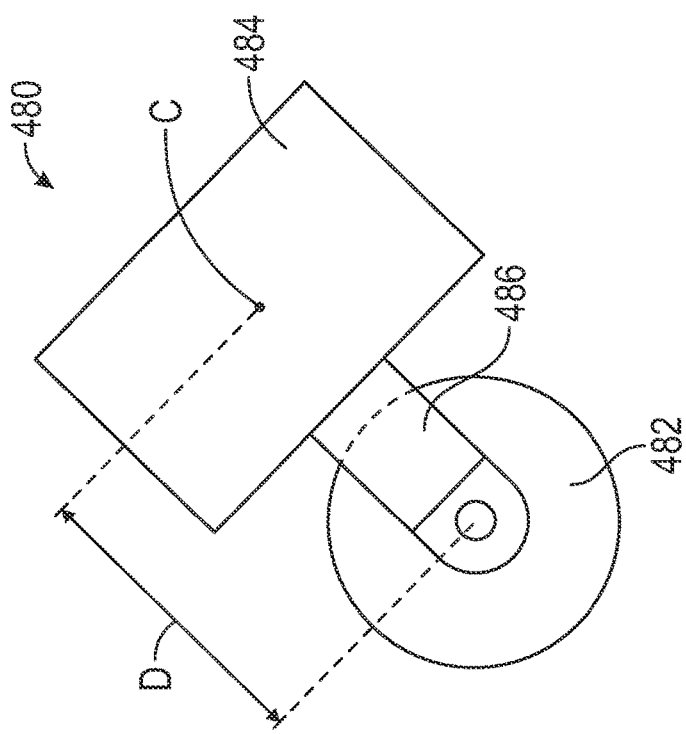
FIG. 8 is a side view of a vibrator of the silage compactor of FIG. 6, according to an exemplary embodiment.

FIG. 9 illustrates an exemplary embodiment of the vibrator 480. In the embodiment of FIG. 9, the vibrator 480 is a rotary vibrator. The vibrator 480 includes an actuator or motor (e.g., an electric motor, a hydraulic motor, a pneumatic motor, etc.), shown as motor 482. An output shaft of the motor 482 is coupled to an unbalanced, eccentric, or radially-offset mass, shown as weight 484. A center of mass C of the weight 484 is radially offset a distance D from the axis of rotation of the shaft of the motor, such that rotation of the weight 484 by the motor 482 causes the vibrator 480 to vibrate. An actuator (e.g., a linear actuator, an electric actuator, a hydraulic actuator, etc.), shown as weight actuator 486, couples the weight 484 to the shaft of the motor 482. The weight actuator 486 is configured to move the weight 484 radially relative to the motor 482 such that the weight actuator 486 varies the distance D. In other embodiments, the vibrator 480 is a different type of vibrator (e.g., a vibrator including a mass that oscillates along a linear guide).

Referring to FIG. 9, in some embodiments, the vehicle 10 includes a hydraulic power system or hydraulic circuit, shown as hydraulic system 500, that is configured so supply pressurized hydraulic fluid to drive various actuators of the vehicle 10. The hydraulic system 500 includes a hydraulic pump, shown as pump 502. The pump 502 is operatively coupled to the prime mover 52. The pump 502 is configured to receive rotational mechanical energy from the prime mover 52 and provide hydraulic fluid at an elevated pressure. The pump 502 is fluidly coupled to one or more fluid control devices or flow control devices, shown as valves 504, that are configured to supply pressurized hydraulic fluid to one or more actuators. As shown, the valves 504 are configured to direct hydraulic fluid to the lift actuators 450 and the vibrators 480 (e.g., the motors 482 and the weight actuators 486 of the vibrators 480). The valve 504 may vary the flow to each of the actuators (e.g., individually or together) to control the operation of the actuators. The actuators are each fluidly coupled to a low-pressure tank, shown as reservoir 506. The hydraulic fluid exits the actuators at a low pressure and is stored within the reservoir 506. The reservoir 506 is fluidly coupled to the pump 502 such that the reservoir 506 provides fluid to the pump 502 at a low pressure.

Figure 10:
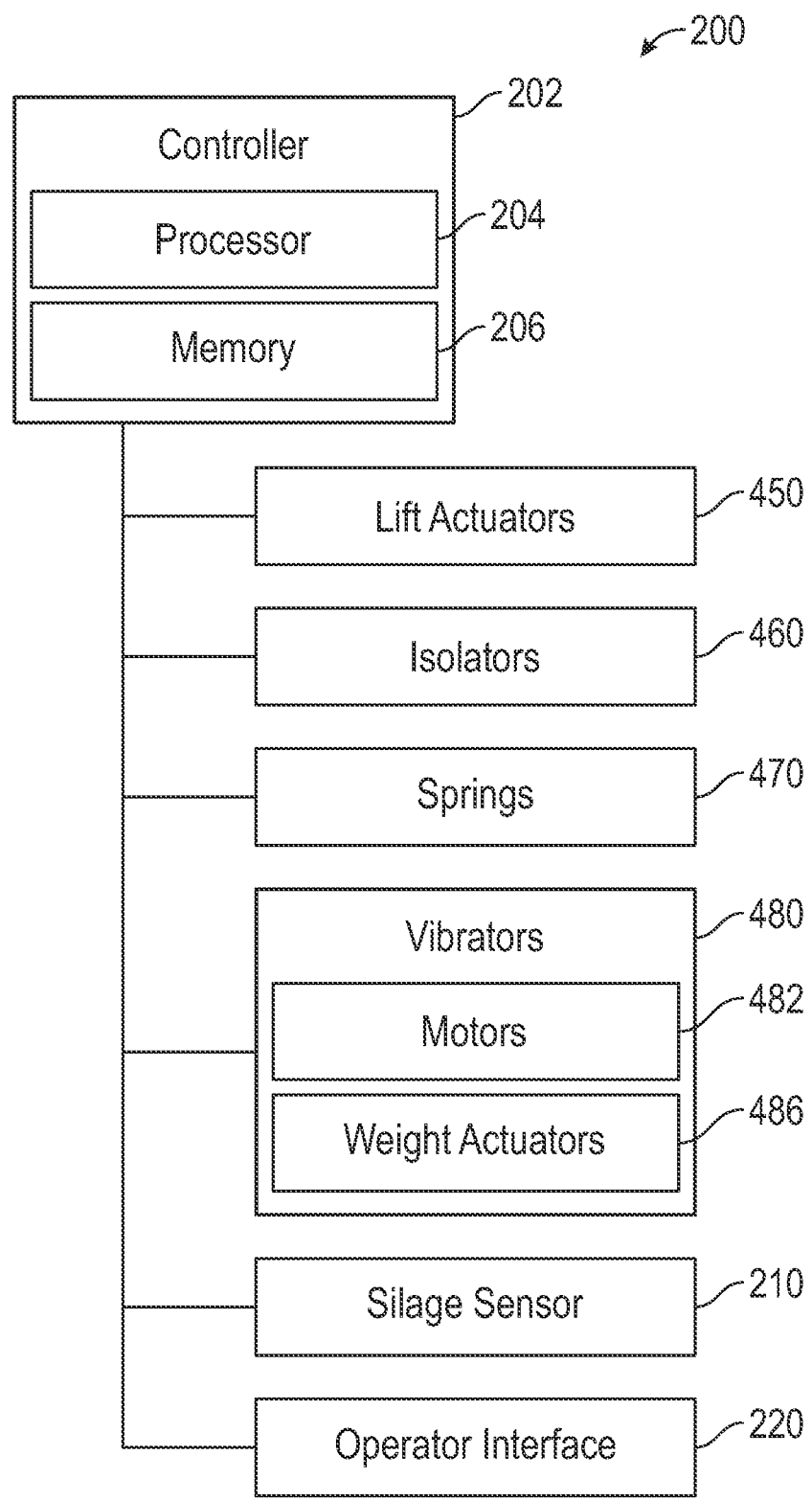
FIG. 10 is a schematic block diagram of a control system of the vehicle of FIG. 1, according to an exemplary embodiment.

Referring to FIG. 10, the control system is shown according to an exemplary embodiment, the control system 200 is shown according to an exemplary embodiment. The control system 200 includes a vehicle controller, shown as controller 202, that controls operation of the vehicle 10. The controller 202 includes a processor 204 and a memory 206. The memory 206 may contain one or more instructions that are executed by the processor 204 to perform the various processes described herein. As shown, the controller 202 is operatively coupled to the lift actuators 450, the isolators 460, the springs 470, and the vibrators 480. In other embodiments, the controller 202 is operatively coupled to one or more other components of the vehicle 10.

The controller 202 may control operation of the actuators of the vehicle 10 (e.g., the lift actuators 450, the vibrators 480, etc.). By way of example, the controller 202 may vary the supply of electrical energy (e.g., the voltage, the current, etc.) to one or more actuators. In some embodiments, the controller 202 varies the flow of hydraulic fluid within the hydraulic system 500 to control the actuators. By way of example, the controller 202 may control the valves 504 to vary the flow of hydraulic fluid to each actuator. By way of another example, in embodiments where the pump 502 is a variable displacement pump and/or where the actuators are variable displacement motors, the controller 202 may control the displacement of the pump 502 and/or the motors (e.g., by varying an angle of a swashplates) to control the operation of the actuators. In some embodiments, the controller 202 varies the flow of gas within a pneumatic system to control the actuators. By way of example, the controller 202 may control the operation of compressors and/or valves to control the operation of the actuators.

In some embodiments, the controller 202 may receive information from one or more inputs (e.g., sensors, user inputs, etc.). The control system 200 includes a sensor, shown as silage sensor 210, that provides information related to a condition of the silage 308. In some embodiments, the silage sensor 210 provides information relating to a depth of the silage 308 (e.g., a depth of the silage directly beneath the wheel 402). In some such embodiments, the silage sensor 210 indicates a vertical position of the vehicle 10. Because the vehicle 10 rides along a top surface of the silage 308, the controller 202 may use the vertical position of the vehicle 10 to determine the depth of the silage 308. By way of example, if the ground beneath the silage 308 is substantially level, the controller 202 may recognize the height of the vehicle 10 resting directly on the ground as corresponding to 0 feet of silage depth. Subsequently, the change in height from the initial vertical position may indicate the depth of the silage 308. If the ground beneath the silage 308 is not substantially level but the topography of the ground is known, the controller 202 may utilize the lateral and longitudinal coordinates of the vehicle 10 to determine the height of the ground and adjust the determined depth of the silage 308. In some embodiments, the silage sensor 210 includes an altimeter. In some embodiments, the silage sensor 210 includes a global positioning system (GPS). In some embodiments, the silage sensor 210 includes an accelerometer, and the controller 202 determines the position of the vehicle 10 based on the measured accelerations.

The control system 200 includes one or more input devices and/or output devices, shown as operator interface 220. The operator interface 220 may include one or more input devices configured to receive information (e.g., commands) from an operator. By way of example, the operator interface 220 may include touch screens, switches, dials, steering wheels, pedals, levers, or other input devices. The operator interface 220 may include one or more output devices configured to provide information (e.g., current settings, current operating conditions, etc.) to the operator. By way of example, the operator interface 220 may include screens, lights, speakers, haptic feedback devices, or other output devices.

The operation of the vehicle 10 to compact the silage 308 will now be described according to an exemplary embodiment. The operator controls the vehicle 10 to loosely pile the silage 308 within the storage volume 306 of the bunker 300. The operator steers the vehicle 10 atop the pile of silage 308. The operator may interact with the operator interface 220, causing the controller 202 to control the lift actuators 450 to lower the wheel 402 into contact with the silage 308. The controller 202 may activate the vibrator 480 automatically when the wheel 402 is in contact with the silage 308. Alternatively, the operator may interact with the operator interface 220, causing the controller 202 to activate the vibrator 480. The operator may then steer the vehicle 10 to drive along the top surface of the silage 308, compressing the silage 308 with the wheel 402, the front tractive elements 78, and/or the rear tractive elements 88.

The wheel 402 imparts a downward force on the silage 308, compressing the silage 308 and expelling air from the pile of silage 308. The downward force may be the combination of the weight of the wheel 402 and other forces acting on the wheel 402. By way of example, the downward force may include the weight of the ballast 432, the weight of other portions of the vehicle 10 (e.g., the frame 12, the body 20, the cab 30, the prime mover 52, etc.), the biasing force of the springs 470, force imparted by the vibrator 480, and/or other forces.

The vibration of the wheel 402 may facilitate compaction of the silage 308 by the wheel 402. By way of example, the vibration may impart additional downward force, further compacting the silage 308. By way of another example, the vibration may shake the silage 308, facilitating alignment of the silage 308 with air pockets within the pile, quickly and densely compacting the silage 308.

The isolators 460 and the springs 470 cooperate to stabilize the frame 12 and the components of the vehicle 10 fixedly coupled to the frame 12 (e.g., the cab 30, the prime mover 52, etc.) throughout operation of the vehicle 10. The isolators 460 may oppose rapid movements of the frame 12 relative to the wheel 402, minimizing the transmission of vibrations from the wheel 402 to the frame 12. The springs 470 provide biasing forces to maintain a vertical position of the frame 12 relative to the wheel 402. In some embodiments, the damping characteristics (e.g., the damping constants) of the isolators 460 and/or the spring characteristics (e.g., the spring constants) of the springs 470 may be selected based on the vibration characteristics (e.g., frequency, amplitude, etc.) of the vibrator 480. By way of example, the damping characteristics and/or the spring characteristics may be selected to minimize the transfer of vibrations caused by the vibrator 480 from the wheel 402 to the frame 12.

In some embodiments, the controller 202 is configured to vary the vibration characteristics of the vibrator 480 throughout operation of the vehicle 10. By way of example, the controller 202 may control the operation of the motor 482 and/or the weight actuator 486 to vary the vibration characteristics of the vibrator 480. The controller 202 may vary the frequency of the vibrations produced by the vibrator 480 by varying the speed of the motor 482. The controller 202 may vary the amplitude of the vibrations produced by the vibrator 480 (e.g., the displacement of the vibrator 480 during vibration) by controlling the weight actuator 486 to vary the distance D between the center of gravity C of the weight 484 and the axis of rotation of the weight 484. The controller 202 may vary the energy conveyed by the vibrations by varying the speed of the motor 482 and/or by controlling the weight actuator 486 to vary the distance D.

In some embodiments, the controller 202 is configured to vary the vibration characteristics based on the characteristics of the silage 308. By way of example, the controller 202 may vary the vibration characteristics of the vibrator 480 based on the depth of the silage 308 (e.g., the depth of the silage 308 directly beneath the wheel 402). In some embodiments, the controller 202 is configured to vary the vibration characteristics of the vibrator 480 based on the output of the silage sensor 210. By way of example, the controller 202 may vary the vibration characteristics proportionally to the depth of the silage 308 reported by the silage sensor 210. By way of another example, the controller 202 may (a) operate the vibrator 480 with a first set of vibration characteristics (e.g., a first frequency, a first amplitude, a first energy of the vibrations, a first rotation speed of the weight 484, a first distance D of the center of gravity C, etc.) when the depth of the silage 308 is within a first range of depths and (b) operate the vibrator 480 with a second set of vibration characteristics when the depth of the silage 308 is within a second range of depths.

In some embodiments, the controller 202 is configured to vary the vibration characteristics of the vibrator 480 based on an input from the operator (e.g., through the operator interface 220). By way of example, the operator interface 220 may provide an interface (e.g., a graphical user interface) through which the operator may select between one or more vibration settings, each associated with a different vibration level. In some embodiments, the interface may associate each vibration setting with a depth of the silage 308. By way of example, each vibration setting may be marked as "low depth," "high depth," "0-6 feet of silage," "6-12 feet of silage," etc. In some embodiments, the interface may associate each vibration setting with a compaction status of the silage 308. By way of example, each vibration setting may be marked as "uncompacted," "mid-compaction," "final compaction," etc.

Figure 11:
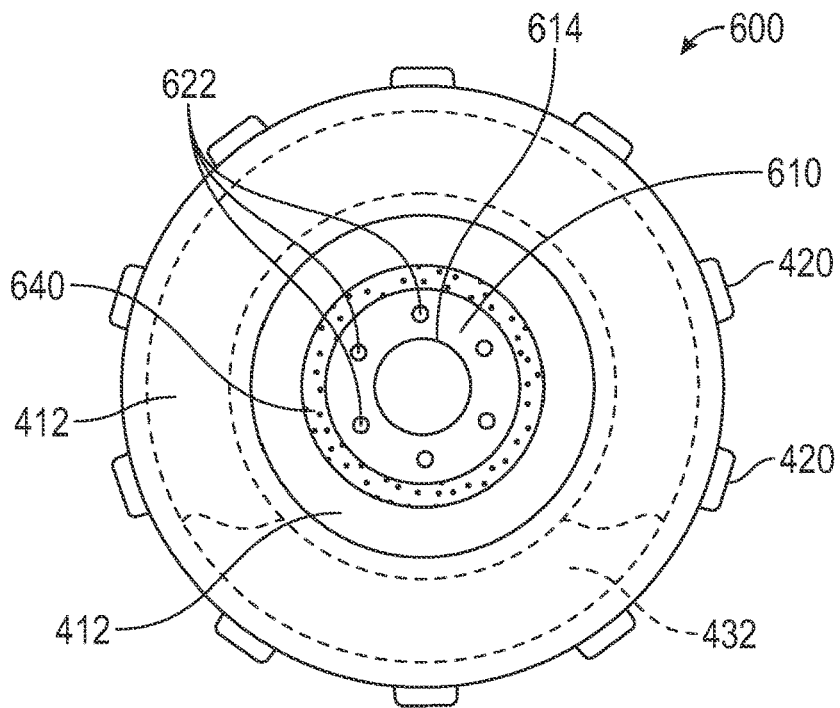
FIG. 11 is a left side view of a configuration of the silage compactor of FIG. 6, according to an exemplary embodiment.
Figure 12:
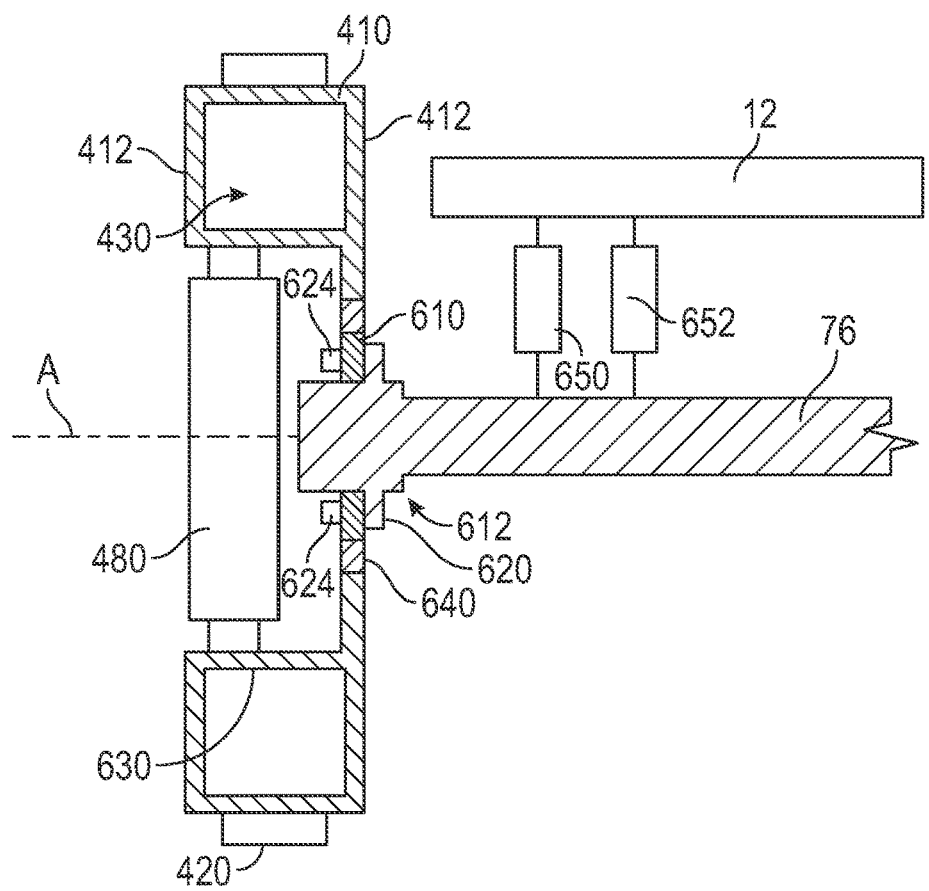
FIG. 12 is a front section view of configuration of FIG. 11.

Referring to FIGS. 11 and 12, a wheel 600 is shown as an exemplary configuration of the wheel 402. The wheel 600 may be substantially similar to the wheel 402, except as otherwise specified herein. As shown, the wheel 600 replaces one of the front tractive elements 78. The wheel 600 may replace any of the tractive elements of the vehicle 10. By way of example, the wheel 600 may replace the front tractive element 78 on the left side of the vehicle 10, the front tractive element 78 on the right side of the vehicle 10, the rear tractive element 88 on the left side of the vehicle 10, and/or the rear tractive element 88 on the right side of the vehicle 10. Accordingly, any description of the wheel 600 with respect to the front axle 76 may also apply to the wheel 600 with respect to the rear axle 86.

In the embodiment shown in FIGS. 11 and 12, the silage compactor 400 includes a wheel adapter or coupler, shown as hub coupler 610. The hub coupler 610 couples the wheel 600 to an end portion of the front axle 76, shown as hub 612. The hub coupler 610 defines a central aperture, shown as hub aperture 614. The hub 612 extends through the hub aperture 614, such that engagement between an outer circumference of the hub 612 engages an inner circumference of the hub coupler 610 to align the wheel 600 with the front axle 76.

The hub 612 includes a radial flange, shown as hub flange 620. The hub coupler 610 abuts the hub flange 620 to define a position of the wheel 600 along the front axle 76. The hub coupler 610 further defines a series of fastener apertures, shown as bolt apertures 622, that are radially offset from an axis of rotation A of the hub 612. Each bolt aperture 622 is configured to receive a fastener 624 (e.g., a bolt, a nut, etc.) that couples the hub coupler 610 to the hub flange 620. By way of example, the fasteners 624 may be fixedly coupled to the hub flange 620 and/or in threaded engagement with the hub flange 620. The bolt apertures 622 may be arranged in a pattern that is similar to that of one of the front tractive elements 78. Accordingly, the wheel 600 may be attached to the hub 612 using the same fasteners 624 as the front tractive elements 78, facilitating interchangeability of the wheel 600 and the front tractive element 78, depending upon the desired application of the vehicle 10.

The wheel 600 includes the outer wall 410, the side walls 412, and a circumferential wall, shown as inner wall 630. The inner wall 630 is offset radially inward from the outer wall 410. Accordingly, the volume 430 of the wheel 600 annular and defined between the outer wall 410, the side walls 412, and the inner wall 630.

As shown in FIGS. 11 and 12, an isolator (e.g., an isolator 460) or compliant member, shown as compliant coupler 640, couples the hub coupler 610 to the wheel 600. Specifically, the compliant coupler 640 extends radially between and is directly coupled to the hub coupler 610 and one of the side walls 412 of the wheel 600. The compliant coupler 640 is made of a compliant material, such as rubber or plastic. Accordingly, the compliant coupler 640 may reduce the transfer of vibrations from the wheel 600 to the front axle 76. However, the compliant coupler 640 may still transfer torque between the front axle 76 and the wheel 600. According to an exemplary embodiment, the prime mover 52 drives rotation of the front axle 76, the hub flange 620 and the corresponding fasteners transfer rotational mechanical energy to the hub coupler 610, the hub coupler 610 transfers rotational mechanical energy to the compliant coupler 640, and the compliant coupler 640 transfers rotational mechanical energy to the wheel 600 to drive the wheel and propel the vehicle 10. During a braking operation, this energy flow may be reversed. In other embodiments, the compliant coupler 640 and the hub coupler 610 are omitted, and the side wall 412 of the wheel 600 defines the hub aperture 614 and the bolt apertures 622.

As shown in FIG. 12, the vehicle 10 includes a spring (e.g., a spring 470) shown as coil spring 650, and an isolator (e.g., an isolator 460), shown as damper 652. The coil spring 650 and the damper 652 couple the front axle 76 to the frame 12. The coil spring 650 and the damper 652 may each be part of a suspension system of the vehicle 10.

Referring still to FIG. 12, the vibrator 480 is coupled directly to the wheel 600. Specifically, the vibrator 480 is positioned within a volume defined between the inner wall 630 and one of the side walls 412. The vibrator 480 may be directly coupled to the inner wall 630 and/or to the side wall 412. The vibrator 480 may be operatively coupled to the controller 202 by one or more conduits (e.g., hoses for hydraulic fluid or compressed gas) or wires that extend around the wheel 600 and/or through the center of the front axle 76.

Figure 13:
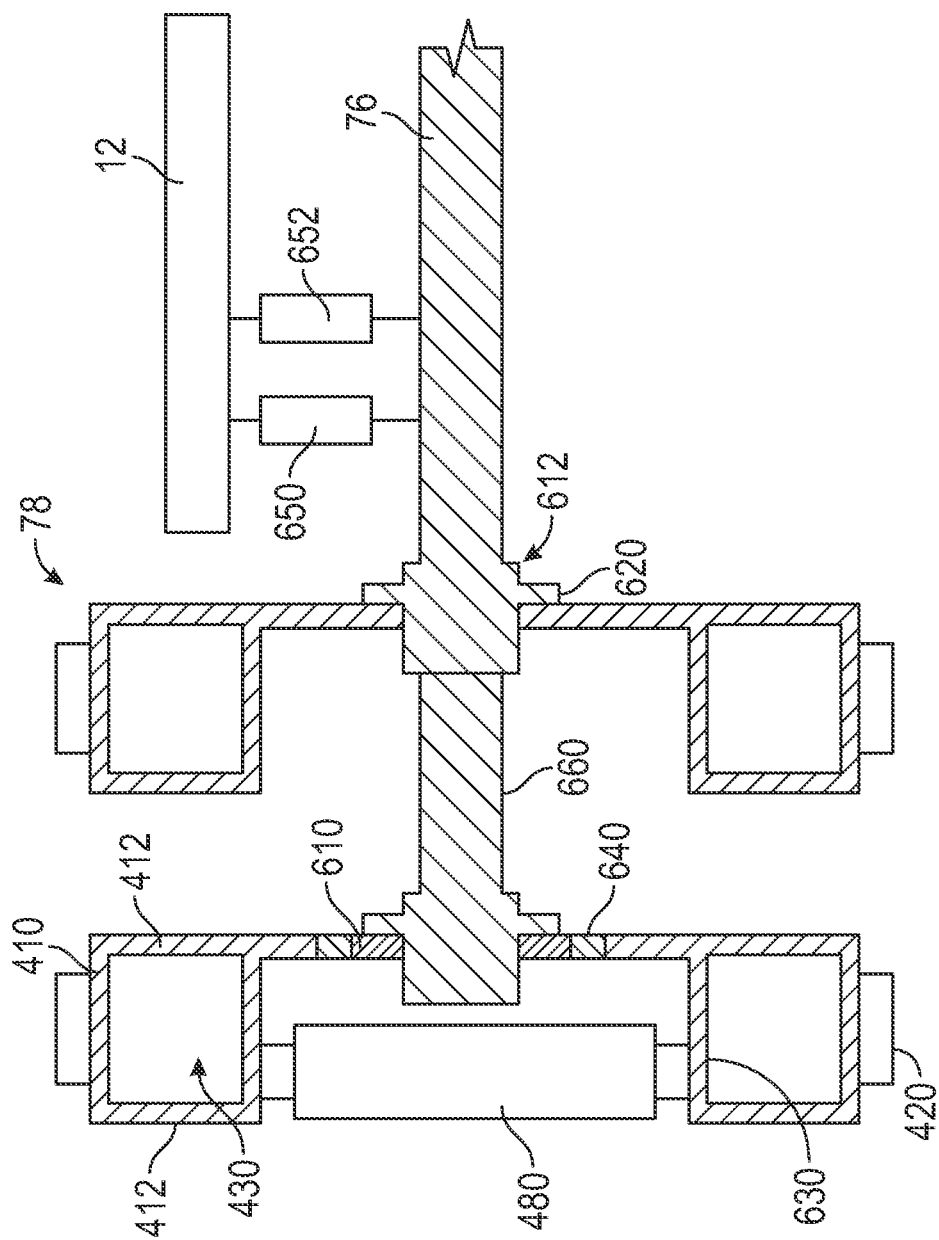
FIG. 13 is a front section view of a configuration of the silage compactor of FIG. 6, according to another exemplary embodiment.

Referring to FIG. 13, an alternative configuration of the vehicle 10 including the wheel 600 is shown according to an exemplary embodiment. In this embodiment, the front tractive element 78 is coupled to the hub 612 of the front axle 76. An adapter, shown as adapter shaft 660, couples the wheel 600 to the front axle 76. The adapter shaft 660 may have a similar arrangement to the hub 612 to facilitate attachment of the wheel 600 to the adapter shaft 660. The adapter shaft 660 couples (e.g., removably to facilitate assembly) to the front axle 76 such that the adapter shaft 660 transfers torque between the wheel 600 and the front axle 76. In other embodiments, the adapter shaft 660 couples the wheel 600 to the front tractive element 78.

Figure 14:
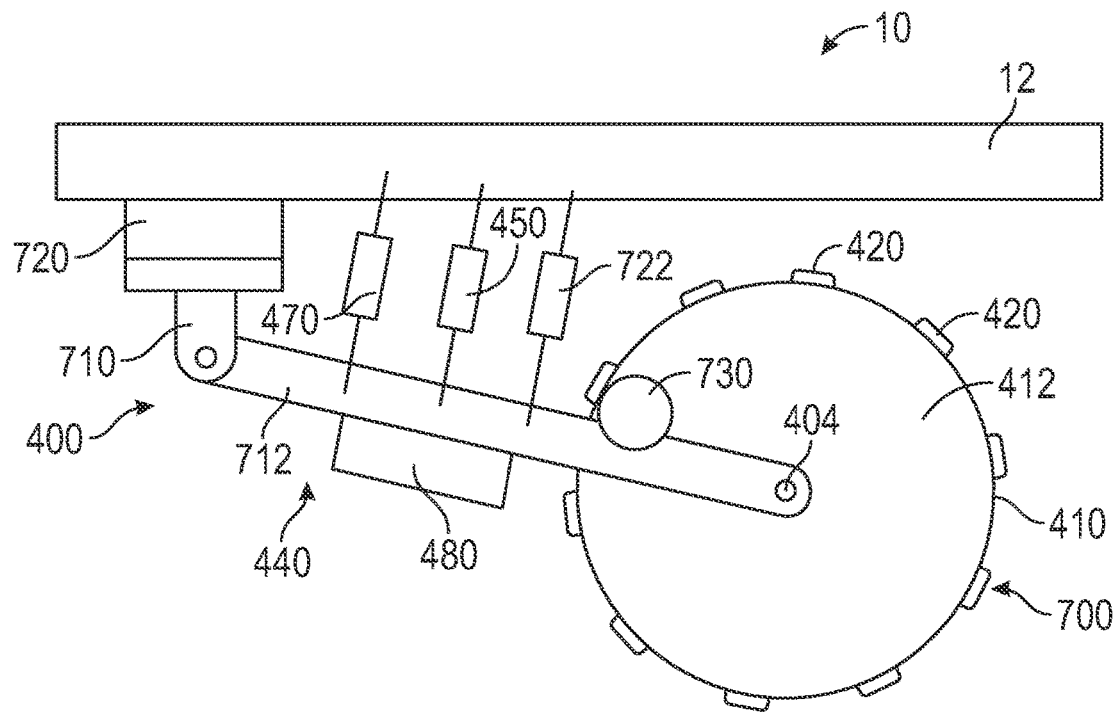
FIG. 14 is a left side view of a configuration of the silage compactor of FIG. 6, according to another exemplary embodiment.

Referring to FIG. 14, a wheel 700 is shown as an exemplary configuration of the wheel 402. The wheel 700 may be substantially similar to the wheel 402, except as otherwise specified herein. As shown, the wheel 700 is coupled to the frame 12 and supplements the front tractive elements 78 and the rear tractive elements 88.

In the configuration shown in FIG. 14, the subframe 440 includes a first portion or fixed portion, shown as clevis 710, and a second portion or rotating portion, shown as swinging member 712. A first end portion of the swinging member 712 is rotatably coupled to the clevis 710. Accordingly, the swinging member 712 is configured to rotate relative to the clevis 710 about a lateral axis. A second end portion of the swinging member 712 is rotatably coupled to the wheel 700.

Accordingly, the wheel 700 is configured to rotate upward and downward with the swinging member 712.

The vehicle 10 further includes a first isolator (e.g., an isolator 460), shown as compliant member 720. The compliant member 720 is a second of compliant material that inhibits the transfer of vibrations from the clevis 710 to the frame 810. In some embodiments, the compliant member 720 removably couples the clevis 710 to the frame 12. The vehicle 10 further includes a second isolator (e.g., an isolator 460), shown as damper 722. The damper 722 couples the frame 12 to the swinging member 712. The damper 722, a lift actuator 450, and a spring 470 each couple the frame 12 to the swinging member 712. In some embodiments the damper 722, the lift actuator 750, and the spring 470 are each removably coupled to the frame 12. Accordingly, the silage compactor 400 may be removed from the frame 12 (e.g., to facilitate reconfiguring the vehicle 10 between different applications).

In some embodiments, the silage compactor 400 includes a driver or actuator (e.g., a hydraulic motor, an electric motor, a pneumatic motor, etc.), shown as motor 730. The motor 730 is coupled to the swinging member 712 and the wheel 700. The controller 202 may control the motor 730 to drive the wheel 700 and propel the vehicle 10.

Figure 15:
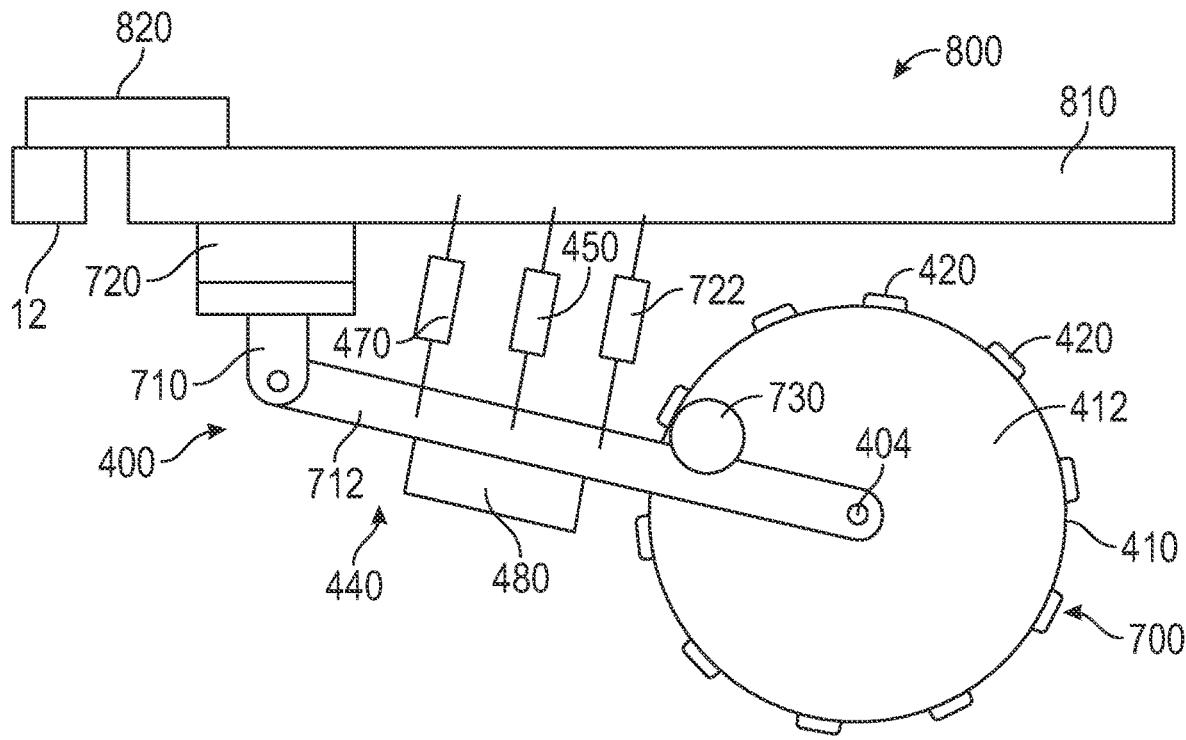
FIG. 15 is a left side view of a configuration of the silage compactor of FIG. 6, according to another exemplary embodiment.

Referring to FIG. 15, an implement is shown as trailer 800 according to an exemplary embodiment. The trailer 800 may be substantially similar to the arrangement of FIG. 14 except as otherwise specified. The trailer 800 may be removably coupled to the frame 12 of the vehicle 10 such that the trailer 800 can be towed behind the vehicle 10. The trailer 800 includes a structural member or chassis, shown as frame 810. A compliant member 720, a damper 722, a spring 470, and a lift actuator 450 are removably coupled to the frame 810. A coupler, shown as hitch 820, removably couples the frame 810 to the frame 12. The hitch 820 may permit articulation or pivoting of the frame 810 relative to the frame. The hitch 820 may be a three-point hitch, a ball hitch receiver, or another type of hitch.

Figure 16:
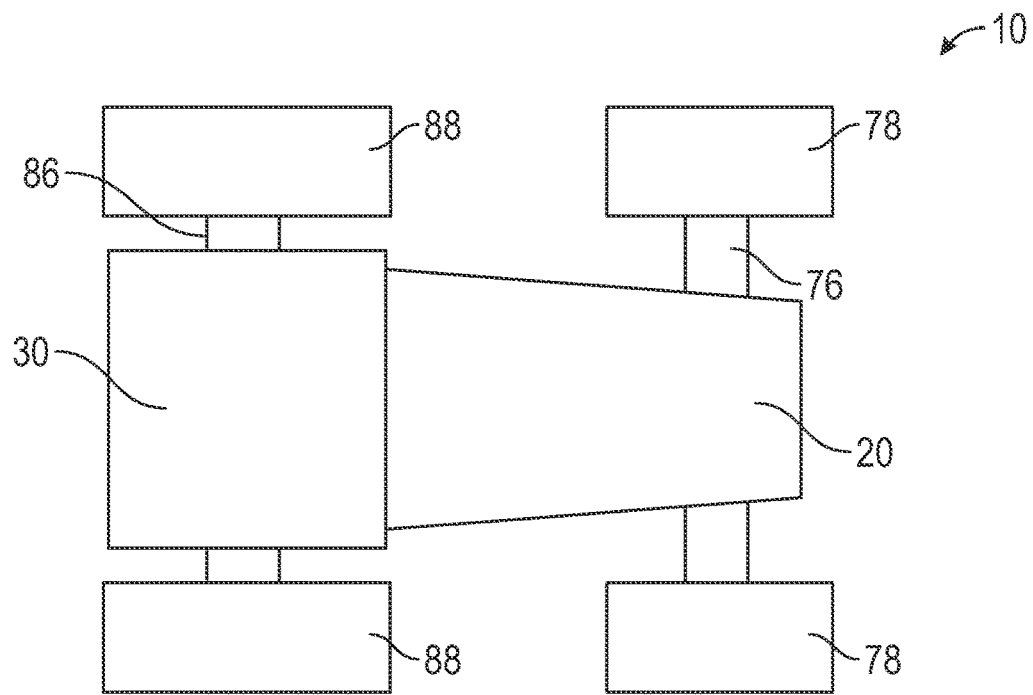
FIG. 16 is a top view of the vehicle of FIG. 1 without the silage compactor of FIG. 6.
Figure 17:
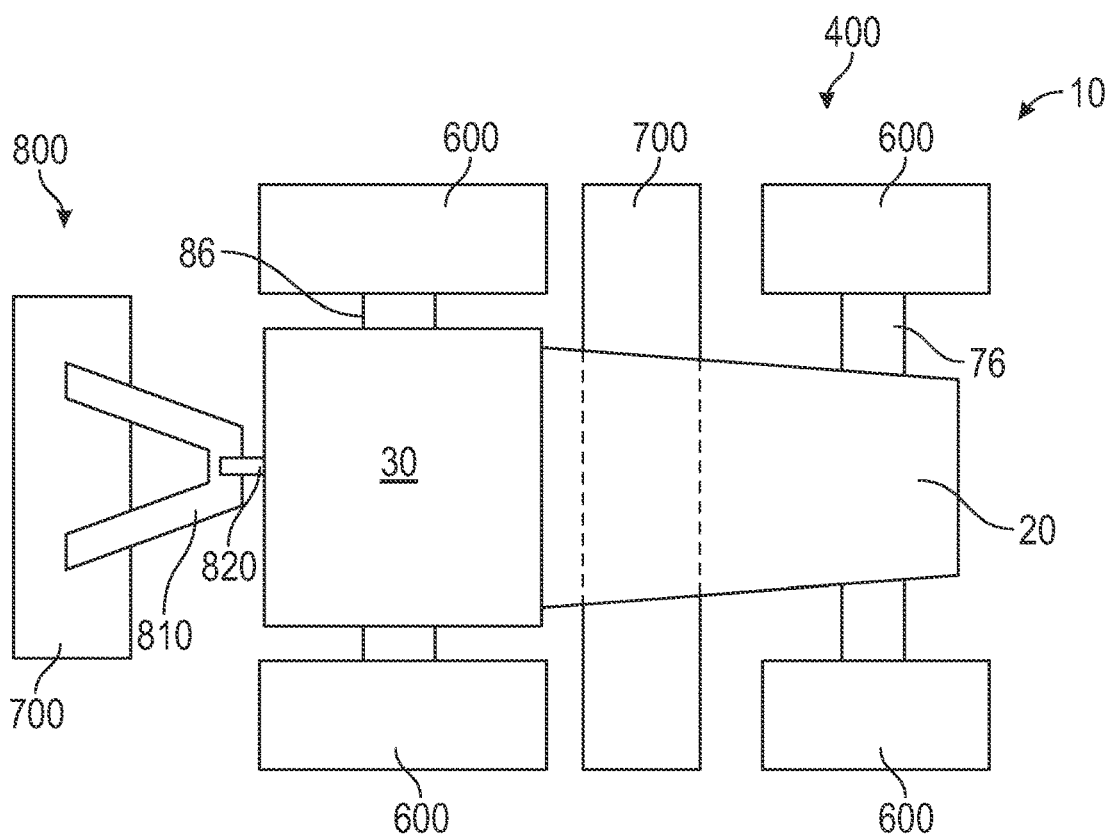
FIG. 17 is a top view of the vehicle of FIG. 1 with the silage compactor of FIG. 11, the silage compactor of FIG. 14, and the silage compactor of FIG. 15.

FIG. 16 illustrates a configuration of the vehicle 10 without the silage compactors 400. FIG. 17 illustrates a configuration of the vehicle 10 with multiple silage compactors 400. To reconfigure the vehicle 10 from the configuration of FIG. 16 to the configuration of FIG. 17, each of the front tractive elements 78 and the rear tractive elements 88 are removed and replaced with a wheel 600. The wheels 600 may each have similar widths and lateral positions to the front tractive elements 78 and the rear tractive elements 88. A wheel 700 is coupled to the frame 12. A trailer 800 is coupled to the frame 12. The wheel 700 coupled to the frame 12 extends laterally across the vehicle 10 from an outer surface of one wheel 600 coupled to the rear axle 86 to an outer surface of the other wheel 600 coupled to the rear axle 86. The wheel 700 of the trailer 800 extends laterally across the vehicle 10 from an inner surface of one wheel 600 coupled to the rear axle 86 to an inner surface of the other wheel 600 coupled to the rear axle 86. In other embodiments, the wheels 600 and/or the wheels 700 have other widths.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

The invention claimed is:

1. A vehicle comprising:
a frame;
a tractive element coupled to the frame;
a prime mover coupled to the frame and configured to drive the tractive element to propel the vehicle; and
a silage compactor, comprising:
a wheel rotatably coupled to the frame and positioned to engage silage positioned below the frame;
a vibrator coupled to the wheel and configured to cause the wheel to vibrate;
a silage sensor configured to provide information indicating a depth of the silage, the depth of the silage being measured from a bottom surface of the silage to a top surface of the silage; and
a controller configured to control the vibrator to vibrate the wheel while the wheel is in contact with the silage to compress the silage, wherein the controller is configured to vary a vibrational characteristic of the vibrator in response to the depth of the silage exceeding a threshold depth.

2. The vehicle of claim 1, wherein the wheel is coupled to the prime mover, and wherein the prime mover is configured to drive the wheel to propel the vehicle.

3. The vehicle of claim 2, further comprising a hub rotatably coupled to the frame, wherein the wheel is removably coupled to the hub, and wherein the tractive element is configured to be removably coupled to the hub.

4. The vehicle of claim 3, wherein the hub is configured to rotate about an axis of rotation, wherein at least one of:
   (a) the wheel defines a plurality of first fastener apertures radially offset from the axis of rotation and configured to receive a plurality of first fasteners to couple the wheel to the hub; or
   (b) the silage compactor includes a coupler coupled to the wheel and the coupler defines a plurality of second fastener apertures radially offset from the axis of rotation and configured to receive a plurality of second fasteners to couple the coupler to the hub.

5. The vehicle of claim 1, further comprising a pump structured to receive rotational mechanical energy from the prime mover and provide pressurized hydraulic fluid, and wherein the vibrator includes a hydraulic actuator that is fluidly coupled to the pump.

6. The vehicle of claim 1, wherein the controller is configured to vary the vibrational characteristic of the vibrator in response to an input from an operator.

7. The vehicle of claim 6, further comprising an operator interface operatively coupled to the controller, wherein the controller is configured to vary the vibrational characteristic of the vibrator in response to the operator interacting with the operator interface.

8. The vehicle of claim 6, wherein the vibrator includes a motor and a weight coupled to the motor, the weight having a center of mass that is offset from an axis of rotation of the motor, and wherein the controller is configured to vary the vibrational characteristic by varying a rotational speed of the motor.

9. The vehicle of claim 6, wherein the vibrator includes:
a motor;
a weight coupled to the motor, the weight having a center of mass that is offset a distance from an axis of rotation of the motor; and
a weight actuator coupled to the motor and the weight and configured to vary the distance between the center of mass and the axis of rotation,
wherein the controller is configured to vary the vibrational characteristic by varying the distance between the center of mass and the axis of rotation.

10. The vehicle of claim 1, wherein the silage compactor further comprises an isolator coupling the wheel to the frame and configured to inhibit transmission of vibrations from the wheel to the frame.

11. The vehicle of claim 10, wherein the isolator includes a section of compliant material.

12. The vehicle of claim 10, wherein the isolator includes a damper.

13. The vehicle of claim 1, wherein the wheel defines a volume containing ballast, and wherein the ballast is configured to move relative to the wheel as the wheel rotates.

14. The vehicle of claim 13, wherein the ballast is a liquid.

15. A silage compactor for a vehicle, comprising:
a wheel;
an isolator rotatably coupling the wheel to a frame of the vehicle and configured to inhibit transmission of vibrations from the wheel to the frame;
a vibrator coupled to the wheel and configured to cause the wheel to vibrate; and
a controller configured to:
receive a measurement of a depth of silage below the wheel, the depth of the silage being measured from a bottom surface of the silage to a top surface of the silage; and
vary a vibrational characteristic of the vibrator based on the depth of the silage.

16. The silage compactor of claim 15, further comprising a silage sensor operatively coupled to the controller and configured to provide the indication of the depth of the silage below the wheel, wherein the controller is configured to vary the vibrational characteristic of the vibrator in response to the depth of the silage exceeding a threshold depth.

17. A vehicle comprising:
a frame;
a first hub and a second hub each rotatably coupled to the frame;
a prime mover coupled to the frame and configured to drive at least one of the first hub or the second hub;
a tractive element coupled to the first hub, the tractive element including an inflatable tire;
a wheel coupled to the second hub and positioned to engage silage positioned below the frame;
a vibrator coupled to the wheel, the vibrator including a weight and a motor configured to rotate the weight to cause the wheel to vibrate;
a silage sensor configured to indicate a depth of the silage, the depth of the silage being measured from a bottom surface of the silage to a top surface of the silage; and
a controller configured to vary a vibrational characteristic of the vibrator in response to the depth of the silage exceeding a threshold depth.

18. The vehicle of claim 17, wherein the tractive element is removably coupled to the first hub, wherein the wheel is configured to be removed from the second hub and coupled to the first hub.

19. The silage compactor of claim 15, further comprising an operator interface operatively coupled to the controller and configured to provide the indication of the depth of the silage below the wheel.

* * * * *